(12) United States Patent
Dudda et al.

(10) Patent No.: US 10,334,619 B2
(45) Date of Patent: Jun. 25, 2019

(54) RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Torsten Dudda, Aachen (DE); Henrik Enbuske, Stockholm (SE); Gustav Wikström, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 55 days.

(21) Appl. No.: 15/540,356

(22) PCT Filed: May 23, 2017

(86) PCT No.: PCT/SE2017/050553
§ 371 (c)(1),
(2) Date: Jun. 28, 2017

(87) PCT Pub. No.: WO2017/204734
PCT Pub. Date: Nov. 30, 2017

(65) Prior Publication Data
US 2018/0220440 A1 Aug. 2, 2018

Related U.S. Application Data

(60) Provisional application No. 62/339,998, filed on May 23, 2016.

(51) Int. Cl.
*H04L 1/18* (2006.01)
*H04W 72/12* (2009.01)

(52) U.S. Cl.
CPC ....... *H04W 72/1268* (2013.01); *H04L 1/1812* (2013.01); *H04W 72/1289* (2013.01)

(58) Field of Classification Search
CPC .......... H04W 72/1268; H04W 72/1289; H04L 1/1812
See application file for complete search history.

(56) References Cited

U.S. PATENT DOCUMENTS

| | | | |
|---|---|---|---|
| 2011/0310833 A1* | 12/2011 | Lee | H04L 1/1829 370/329 |
| 2013/0003533 A1* | 1/2013 | Barbieri | H04W 36/06 370/225 |
| 2014/0056278 A1* | 2/2014 | Marinier | H04W 72/044 370/330 |

FOREIGN PATENT DOCUMENTS

WO 2009114401 A1 9/2009

OTHER PUBLICATIONS

Unknown, Author, "L2 Latency reduction techniques", Change Request, Ericsson, 3GPP TSG-RAN WG2 Meeting #94, R2-163943, Nanjing, P.R. China, May 23-27, 2016, 1-9.

(Continued)

*Primary Examiner* — Mohammad S Anwar
(74) *Attorney, Agent, or Firm* — Murphy, Bilak & Homiller, PLLC

(57) ABSTRACT

Embodiments herein relate to a method performed by a wireless device (10) for handling uplink, UL, communication from the wireless device (10) in a wireless communication network (1), which wireless device is configured with one or more Semi Persistent Scheduling, SPS, grants and to skip padding transmissions of SPS grant. The wireless device receives a dynamic UL grant from a radio network node indicating one or more resources for an UL transmission to the radio network node. The wireless device determines that a Hybrid Automatic Repeat Request, HARQ, buffer for transmission of a previous transmission comprises data or not, which HARQ buffer is associated with a same HARQ process as the dynamic UL grant. Furthermore, the (Continued)

wireless device (10) transmits the data in the HARQ buffer using one or more resources as indicated by the dynamic UL grant or as indicated by the SPS grant when determined that the HARQ buffer comprises data, and transmits new UL data using the one or more resources as indicated by the dynamic UL grant when determined that the HARQ buffer comprises no data.

18 Claims, 9 Drawing Sheets

(56) References Cited

OTHER PUBLICATIONS

Unknown, Author, "Retransmission issue in short SPS interval", CATT, 3GPP TSG RAN WG2 Meeting, #94, R2-163477, Nanjing, China, May 23-27, 2016, 1-2.

Unknown, Author, "Skip padding option for ULgrants", Ericsson, 3GPP TSG-RAN WG2 #93 bis, R2-162782, Dubrovnik, Croatia, Apr. 11-15, 2016, 1-5.

Unknown, Author, "Text proposal to capture muting behaviour in 36.321", Samsung, 3GPP TSG-RAN WG2 Meeting #94, R2-163672, Nanjing, China, May 23-27, 2016, 1-3.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.1.0, Sep. 2015, 1-254.

3GPP, "3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.1.0, Mar. 2016, 1-85.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.4.0, Sep. 2015, 1-334.

* cited by examiner

RADIO NETWORK NODE, WIRELESS DEVICE AND METHODS PERFORMED THEREIN

TECHNICAL FIELD

Embodiments herein relate to a wireless device, a radio network node and methods performed therein for communication. Furthermore, a computer program and a computer readable storage medium are also provided herein. In particular, embodiments herein relate to handling UL communication from a wireless device in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (P-GW), a Serving Gateway (S-GW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the s1 interface to the EPC, more specifically to the MME by means of an S1-MME interface and to the S-GW by means of an S1-U interface.

The S1-MME interface is used for control plane between eNodeB/E-UTRAN and MME. The main protocols used in this interface are S1 Application Protocol (S1-AP) and Stream Control Transmission Protocol (SCTP). S1AP is the application layer protocol between the radio network node and the MME and SCTP, for example, guarantees delivery of signaling messages between MME and the radio network node.

In LTE-Rel-13 and LTE-Rel-14, latency reduction techniques are discussed and being standardized in 3GPP. Among others, a solution of allowing short Semi-Persistent-Scheduling (SPS) intervals and the possibility to skip UL transmissions when no UL data is available has been discussed.

With SPS in UL, the wireless device is configured with an UL grant, also referred to as SPS grant, indicated with a SPS-Radio Network Temporary Identifier (RNTI), which is valid during the SPS-intervals or occasions preconfigured over Radio Resource Control (RRC) signaling, e.g. every 10 ms, or every 1 ms. During SPS, certain things remain fixed for each allocation e.g. Resource Block (RB) assignments, Modulation and Coding Scheme (MCS), etc. When UL data is available, the wireless device can use the configured UL grant for transmission. According to legacy behavior, the wireless device sends a padding transmission on the configured UL grant, if no data is available. In Rel-14 it is standardized to allow skipping of these padding transmissions.

Retransmissions in SPS can be handled by non-adaptive Hybrid Automatic Repeat Request (HARQ) retransmissions in occasions where an SPS grant, i.e. the preconfigured UL grant, is not valid. This possibility does not exist for 1 ms period, since the SPS grant is valid in all subframes. Retransmissions can also be explicitly handled by the radio network node through adaptive HARQ operation. In this case the radio network node sends another Physical Downlink Control Channel (PDCCH) UL grant to the wireless device, indicated to resources of the SPS interval, triggering an adaptive retransmission by the wireless device. Using the SPS grant for retransmissions may in some cases limit the performance of the wireless communication network.

SUMMARY

An object of embodiments herein is to provide a mechanism for improving performance of the wireless communication network in an efficient manner.

According to an aspect the object is achieved by providing a method performed by a wireless device for handling UL communication from the wireless device in a wireless communication network. The wireless device is configured with one or more SPS grants and the wireless device to skip padding transmissions of SPS grants. The wireless device receives a dynamic UL grant from the radio network node indicating one or more resources for an UL transmission to the radio network node. The wireless device determines that a HARQ buffer for transmission of a previous transmission comprises data or not, which HARQ buffer is associated with a same HARQ process as the dynamic UL grant. The wireless device then transmits the data in the HARQ buffer using one or more resources as indicated by the dynamic UL grant or as indicated by the SPS grant when determined that the HARQ buffer comprises data. The wireless device transmits new UL data using the one or more resources as indicated by the dynamic UL grant when determined that the HARQ buffer comprises no data.

For example, the wireless device may transmit the data in the HARQ buffer using the one or more resources according to the dynamic UL grant or the SPS grant when previously received a Non Acknowledgement (NACK) from the radio network node for the previous transmission, otherwise the wireless device may transmit new UL data, if available.

According to another aspect the object is achieved by providing a method performed by a radio network node for handling UL communication from a wireless device in a wireless communication network. The radio network node determines to schedule a dynamic UL grant to the wireless device, which wireless device is configured with one or more SPS grants and is configured to skip padding transmissions of SPS grants. The radio network node transmits the dynamic UL grant to the wireless device indicating one or more resources for an UL transmission to the radio network node. The radio network node then receives a retransmission of a previous transmission associated with the one or more SPS grants, from the wireless device, over one or more resources as scheduled in the dynamic UL grant or alternatively over one or more resources of the one or more SPS grants.

According to yet another aspect the object is achieved by providing a wireless device for handling UL communication from the wireless device in a wireless communication network, which wireless device is configured with one or more SPS grants and to skip padding transmissions of SPS grants. The wireless device is configured to receive a dynamic UL grant from a radio network node indicating one or more resources for an UL transmission to the radio network node. The wireless device is further configured to determine that a HARQ buffer for transmission of a previous transmission comprises data or not, which HARQ buffer is associated with a same HARQ process as the dynamic UL grant. The wireless device is configured to transmit the data in the HARQ buffer using one or more resources as indicated by the dynamic UL grant or as indicated by the SPS grant when determined that the HARQ buffer comprises data, and to transmit new UL data using the one or more resources as indicated by the dynamic UL grant when determined that the HARQ buffer comprises no data.

According to still another aspect the object is achieved by providing a radio network node for handling UL communication from a wireless device in a wireless communication network. The radio network node being configured to determine to schedule a dynamic UL grant to the wireless device, which wireless device is configured with one or more SPS grants and is configured to skip padding transmissions of SPS grants. The radio network node is further configured to transmit the dynamic UL grant to the wireless device indicating one or more resources for an UL transmission to the radio network node. Furthermore, the radio network node is configured to receive a retransmission of a previous transmission associated with the one or more SPS grants, from the wireless device, over one or more resources as scheduled in the dynamic UL grant, or alternatively over one or more resources of the one or more SPS grants.

It is furthermore provided herein a computer program comprising instructions, which, when executed on at least one processor, cause the at least one processor to carry out any of the methods above, as performed by the radio network node or the wireless device. It is additionally provided herein a computer-readable storage medium, having stored thereon a computer program comprising instructions which, when executed on at least one processor, cause the at least one processor to carry out the method according to any of the methods above, as performed by the radio network node or the wireless device.

Embodiments herein handle transmissions based on dynamic UL grant when an SPS grant is configured for the wireless device, for which SPS intervals and skip padding transmissions are configured for the wireless device. Embodiments provide a clear behaviour of the wireless device to avoid data loss on an HARQ level in case dynamic UL grants are issued when SPS grants are configured. This reduces latency due to higher layer retransmissions from e.g. Radio link Control (RLC), thus embodiments herein enable low-latency use-cases and improve end user performance and thus performance of the wireless communication network in an efficient manner.

BRIEF DESCRIPTION OF THE DRAWINGS

Embodiments will now be described in more detail in relation to the enclosed drawings, in which.

DETAILED DESCRIPTION

Figure 1:
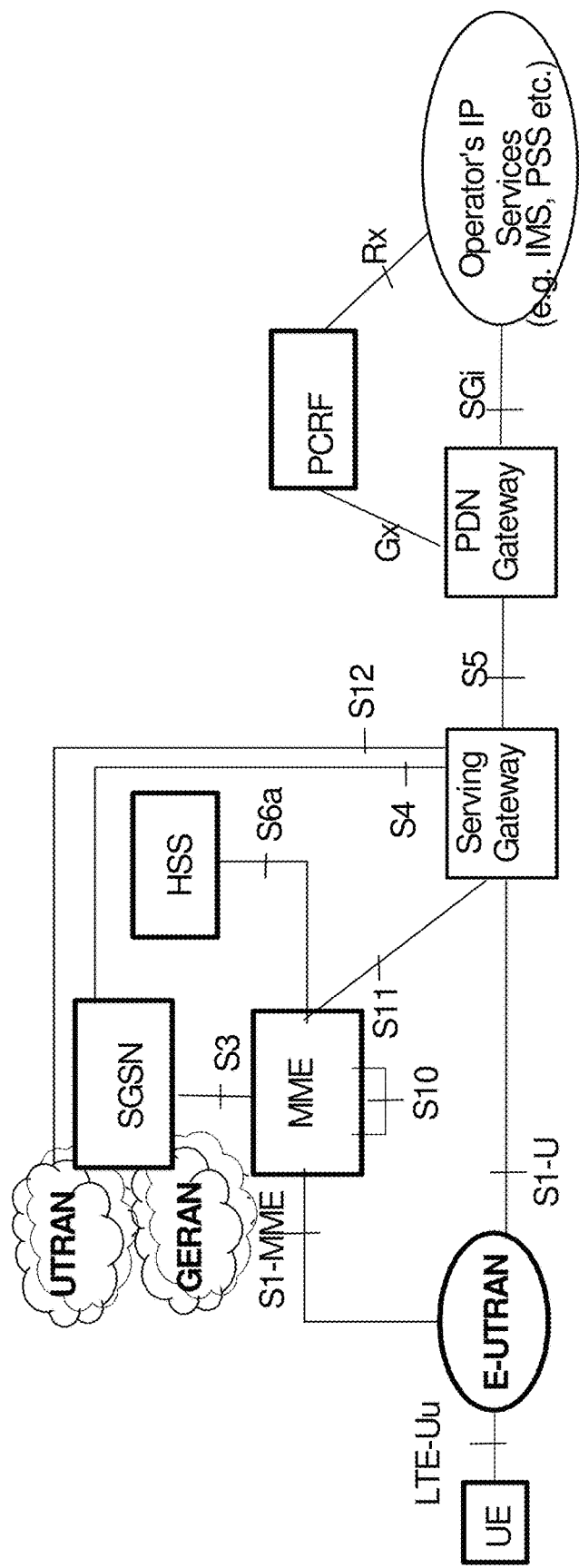
FIG. 1 is a schematic overview depicting a communication network according to prior art.
Figure 2:
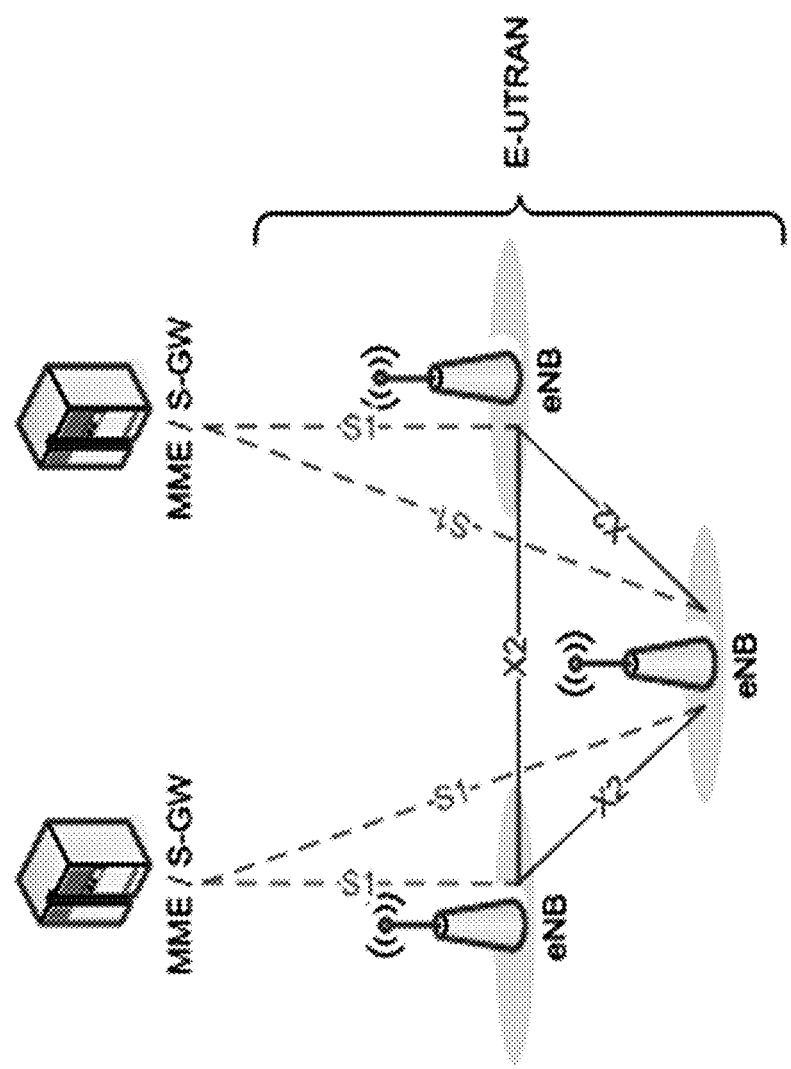
FIG. 2 is a schematic overview depicting a radio access network in connection with a core network.
Figure 3:
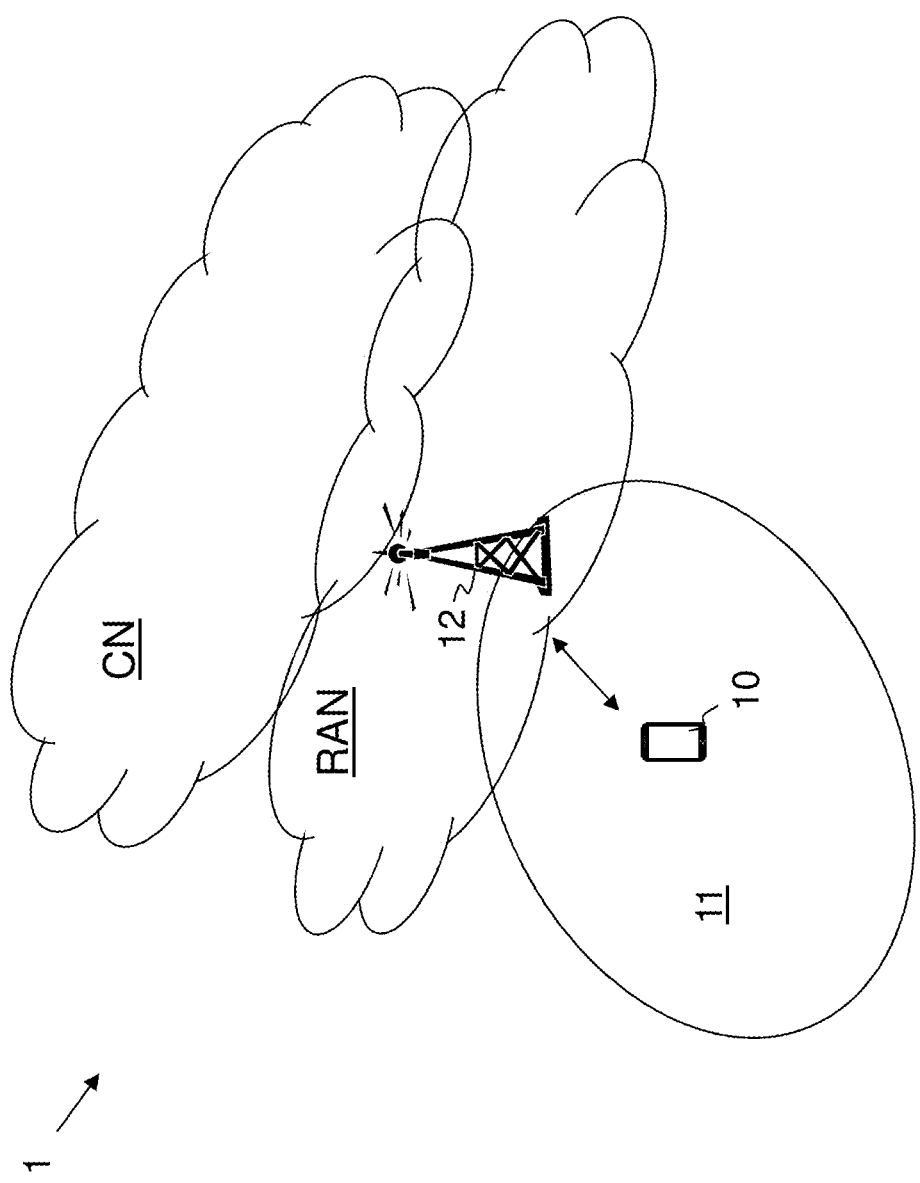
FIG. 3 is a schematic overview depicting a wireless communication network according to embodiments herein.

Embodiments herein relate to communication networks in general. FIG. 3 is a schematic overview depicting a wireless communication network 1. The communication network 1 comprises one or more RANs e.g. a first RAN (RAM), connected to one or more CNs. The communication network 1 may use one or a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments are applicable to 5G and also in further development of the existing communication systems such as e.g. 3G and LTE.

In the wireless communication network 1, wireless devices e.g. a wireless device 10 such as a mobile station, a non-access point (non-AP) STA, a STA, a user equipment and/or a wireless terminal, are connected via the one or more RANs, to the one or more CNs. It should be understood by those skilled in the art that "wireless device" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area.

The wireless communication network 1 comprises a radio network node 12. The radio network node 12 is exemplified herein as a RAN node providing radio coverage over a geographical area, a service area 11, of a radio access technology (RAT), such as LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the radio network node 12 depending e.g. on the radio access technology and terminology used and may be denoted as a scheduling node.

It should be noted that a service area may be denoted as 'cell', beam, beam group or similar to define an area of radio coverage.

As part of developing embodiments herein a problem has been identified. Besides scheduling the wireless device 10 to do non-adaptive and adaptive retransmissions based on SPS resources as stated in the background, the radio network node 12 may also schedule the wireless device 10 to trigger a transmission based on a new dynamic UL grant, e.g. indicated by Cell (C)-RNTI instead of SPS-C-RNTI. If a wireless device receives a dynamic grant when the corresponding HARQ buffer is not empty, e.g. when the wireless device is about to perform a non-adaptive SPS retransmission, the original data will be lost since the HARQ process will be overwritten by new data for transmission, thus limiting the performance of the wireless communication network. The UL grant is corresponding to the SPS grant in the matter of being associated with a same HARQ process number associated with a Transmission Time Interval (TTI). According to current MAC specification (TS 36.321, v. 13.1.0), at the reception of an uplink grant such as the dynamic UL grant:

if the uplink grant is for a Medium Access Control (MAC) entity's C-RNTI and if a previous uplink grant delivered to a HARQ entity for the same HARQ process was either an uplink grant received for the MAC entity's Semi-Persistent Scheduling C-RNTI or a configured uplink grant:

consider the New Data Indicator (NDI) to have been toggled for the corresponding HARQ process regardless of the value of the NDI, i.e. send a new transmission.

deliver the uplink grant and the associated HARQ information to the HARQ entity for this TTI.

That is, in case an SPS grant was received before or is configured, but the current uplink grant is a dynamic grant, a new transmission, which is what NDI=toggled means, is issued. Later on, according to the specification, a new MAC Protocol data Unit (PDU) will be obtained, which overrides the data of the current HARQ buffer. This implies that the previous data of the HARQ buffer is lost.

The current specification is written to support longer SPS periods without the skip padding option. In this case the radio network node would simply not schedule the dynamic grant thus avoid overriding the HARQ buffer. These occasions are anyway rare for longer SPS periods, and additionally, due to mandated padding transmissions, the radio network node is always aware of the current HARQ buffer status.

Embodiments herein handle UL communication from the wireless device 10 in the wireless communication network 1. The wireless device 10 is configured with one or more SPS grants and configured to skip padding transmissions of SPS grants, e.g. handle transmissions based on a dynamic UL grant when an SPS UL grant is configured for the wireless device 10, for which short SPS intervals and skip padding transmissions is enabled.

According to embodiments herein to avoid that data is lost as described above when the wireless device 10 receives the dynamic UL grant from the radio network node 12 indicating one or more resources for an UL transmission to the radio network node 12, the wireless device 10 determines that a HARQ buffer for transmission of a previous transmission comprises data or not, which HARQ buffer is associated with a same HARQ process as the dynamic UL grant. The wireless device then transmits the data in the HARQ buffer using one or more resources as indicated by the dynamic UL grant or as indicated by the SPS grant when determined that the HARQ buffer comprises data. The wireless device transmits new UL data using the one or more resources as indicated by the dynamic UL grant when determined that the HARQ buffer comprises no data.

Hence, in embodiments herein, e.g. in the case of short SPS periods, i.e. SPS periods below a threshold, and the option to skip padding transmissions from the wireless device 10 occurs, the radio network node 12 may schedule one or more dynamic UL grants also referred to as UL grants when one or more SPS grants have been sent and/or configured before for the wireless device 10 and the HARQ buffer is not empty, which the radio network node 12 may not be aware of. The radio network node 12 may e.g. choose to schedule one or more dynamic UL grants if it expects a larger amount of UL data than configured. For example, the radio network node 12 may detect, i.e. notice, that there is more UL data available than the wireless device 10 can efficiently send on the SPS-granted resources. Therefore the radio network node 12 decides to grant dynamically higher resources for transmission and thus schedules one or more dynamic grants for the wireless device 10.

When the wireless device 10 receives a dynamic UL grant, e.g. valid in TTI N and the wireless device 10 is configured with an SPS grant valid in the TTI N before, thus the dynamic UL grant is associated with the SPS grant in the matter of TTI, the wireless device 10 uses the resources indicated on the dynamic UL grant in TTI N instead of the resources indicated on the SPS grant. The wireless device 10 may use redundancy version 0 (RV0) for the transmission over the TTI N, since the radio network node 12 expects a transmission with RV0 when issuing a dynamic UL grant. The wireless device 10 determines whether a HARQ buffer to be transmitted on the TTI N is empty, and if the HARQ buffer of the identified HARQ process corresponding to the TTI N is not empty, i.e. HARQ buffer comprises data for retransmission, e.g. previously indicated for retransmission by feedback data from the radio network node 12, the wireless device 10 considers the NDI as not toggled, i.e. triggers retransmission of the data in the HARQ buffer. This transmission may be considered as a new transmission of previous data in the HARQ buffer, with the HARQ information received in the dynamic UL grant. HARQ information is e.g. redundancy version (e.g. set to RV0), ACK/NACK, modulation coding scheme and other details for transmission. Alternatively, the transmission can be considered an adaptive retransmission based on HARQ information in the dynamic UL grant. A dynamic UL grant is a grant issued to the C-RNTI and the SPS UL grant comprises a SPS C-RNTI, wherein the C-RNTI and the SPS C-RNTI differ. E.g. basically C-RNTI and the SPS C-RNTI are two different numbers/indices indicated in respective grant. The meaning may be "hardcoded", i.e. standardized, and known to the wireless device 10.

Figure 4:
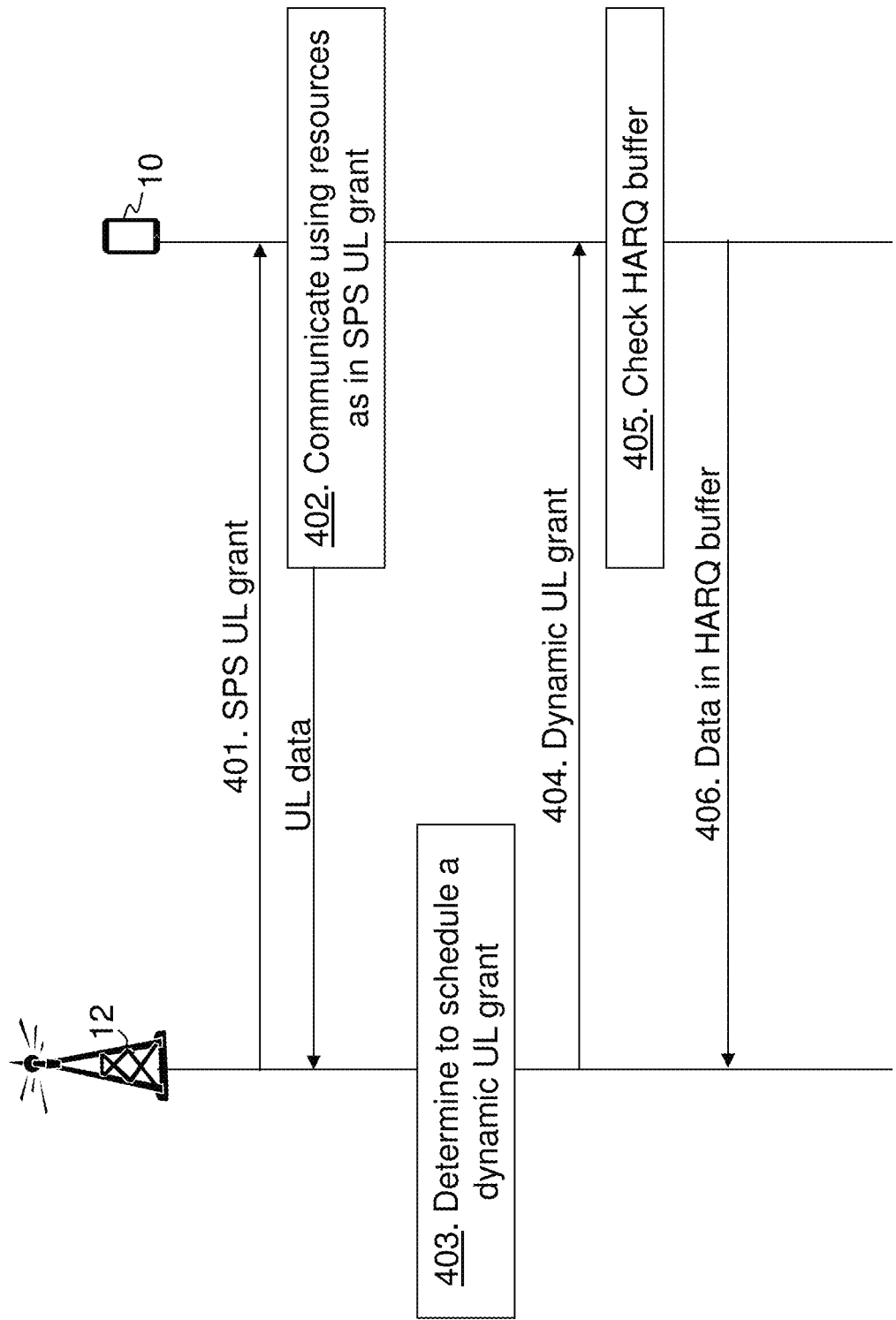
FIG. 4 is a combined flowchart and signalling scheme according to embodiments herein.

FIG. 4 is a combined signalling scheme and flowchart according to embodiments herein for handling UL communication from the wireless device 10 in the wireless communication network 1. The wireless device 10 is configured to skip padding transmissions of SPS grants.

Action 401. The radio network node 12 may schedule one or more SPS grants to the wireless device 10. The one or more SPS grants may be for a TTI with a corresponding HARQ process.

Action 402. The wireless device 10 may then transmit data, UL data, to the radio network node 12 according to the SPS grants, the transmission of UL data is also referred to as a previous transmission below. Some of the data may be retransmitted or buffered for retransmission according to the HARQ process. The wireless device 10 communicates with the radio network node 12 using resources as indicated in SPS grant.

Action 403. The radio network node 12 determines to schedule a dynamic UL grant to the wireless device 10. The radio network node 12 may thus schedule the wireless device 10 for an UL transmission and create the dynamic UL grant. For example, the radio network node 12 may detect that there is more UL data available than the wireless device 10 can efficiently send on the resources of the one or more SPS grants. The dynamic UL grant is associated with the same HARQ process as the previous transmission associated with the one or more SPS grants.

Action 404. The radio network node 12 transmits the dynamic UL grant to the wireless device 10.

Action 405. When the wireless device receives the dynamic UL grant from the radio network node 12 indicating resources for an UL transmission to the radio network node 12, the wireless device determines that a HARQ buffer for transmission of the previous transmission, see action 402, comprises data or that the HARQ buffer is empty. I.e. the wireless device 10 checks the HARQ buffer. The HARQ buffer is associated with a HARQ process with an ID, e.g. a HARQ process ID. The HARQ process ID is identified either from the dynamic UL grant, e.g. indicated as part of the dynamic UL grant, or in case of an SPS configured grant from a TTI. For example, the HARQ process ID may be defined by a function of the TTI such as HARQ_ID=f(TTI). That is, since the configured SPS grant persists for many TT's, different HARQ process IDs are used for each of these TT's. The dynamic UL grant relates to the same HARQ process as the previous transmission e.g. same TTI. Thus, the dynamic UL grant corresponds to the retransmission in relating to the same HARQ process or TTI.

Action 406. According to embodiments herein, the wireless device 10 then transmits the data in the HARQ buffer, in case data is available in the HARQ buffer, using one or more resources as indicated by the dynamic UL grant or the one or more SPS grants.

The wireless device 10 may transmit the data in the HARQ buffer using the one or more resources according to the dynamic UL grant or the SPS grant when previously received a NACK from the radio network node 12 for the previous transmission, otherwise the wireless device may transmit new UL data, if available. By taking into account status of HARQ buffer when receiving the dynamic UL grant one may avoid that data is lost.

The radio network node 12 may thus then receive a retransmission of the previous transmission, see action 402, from the wireless device 10 over one or more resources as scheduled in the dynamic UL grant.

Figure 5:
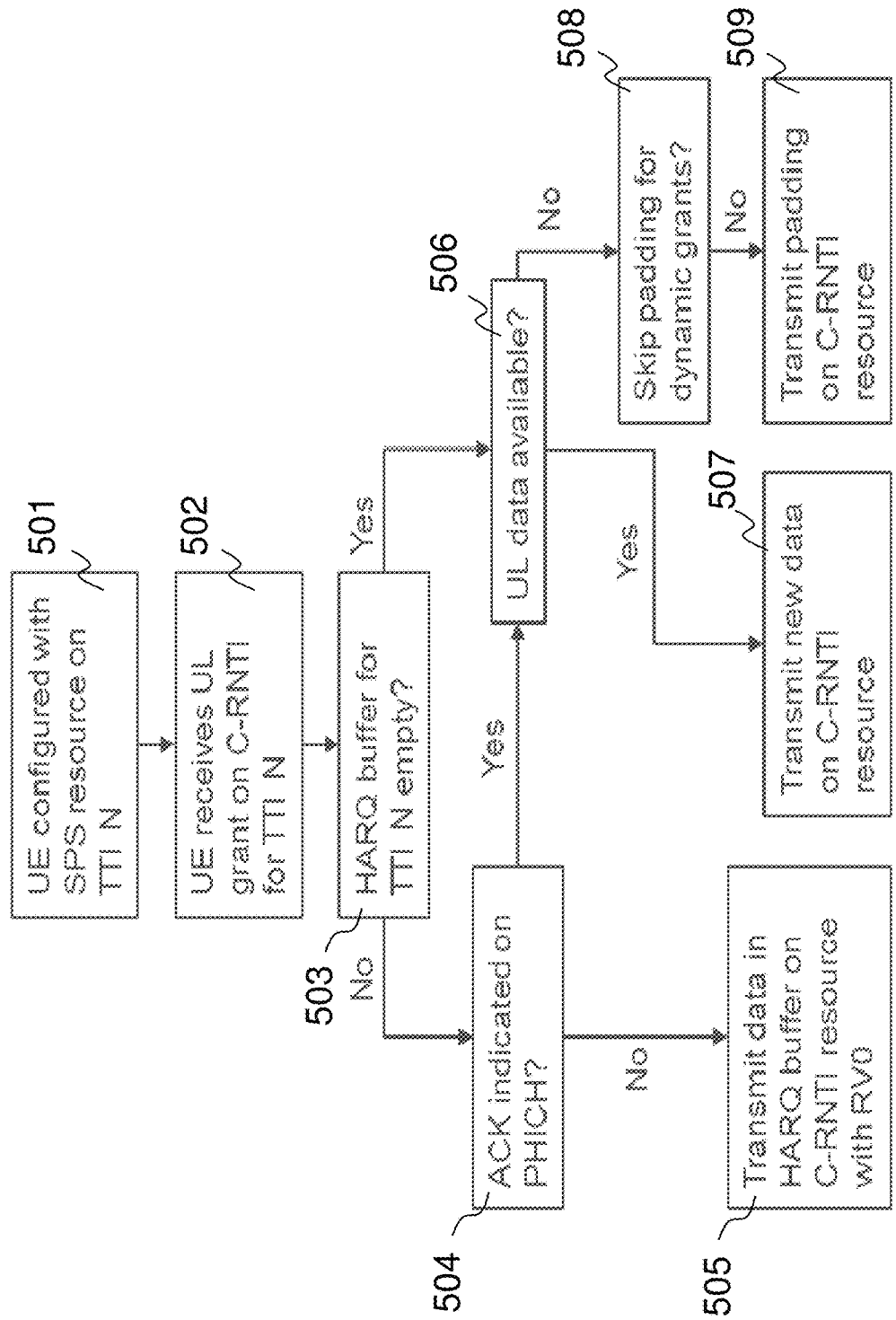
FIG. 5 is a flowchart depicting a method performed by a wireless device according to embodiments herein.

Illustrated in the flow chart in FIG. 5, are some embodiments disclosing some behaviours of the wireless device 10.

Action 501. The wireless device 10 is configured with a SPS grant indicating e.g. SPS resources on the TTI N, see actions 401 and 402 in FIG. 4.

Action 502. The wireless device 10 receives the dynamic UL grant on C-RNTI for the TTI N, thus the dynamic UL grant relates to the same HARQ process as the SPS grant.

Action 503. The wireless device 10 determines whether the HARQ buffer for the TTI N is empty. I.e. does the HARQ buffer for the same HARQ process for the dynamic UL grant comprise data or not?

Action 504. When the HARQ buffer is not empty, the wireless device 10 checks whether an ACK or NACK is indicated on e.g. a Physical Hybrid-ARQ Indicator Channel (PHICH).

Action 505. When no ACK is indicated, or a NACK is indicated on PHICH, the wireless device 10 transmits data in the HARQ buffer on C-RNTI resource e.g. with RV0. Thus, the wireless device 10 uses one or more resources as indicated by the dynamic UL grant to transmit the data in the HARQ buffer see action 406 above.

Action 506. When ACK is indicated on the PHICH, the wireless device 10 checks if UL data, new data, is available.

Action 507. When UL data is available the wireless device 10 transmits the UL data on C-RNTI resource, i.e. using resource of the dynamic UL grant.

Action 508. If no UL data is available, the wireless device 10 determines whether to skip padding for the dynamic UL grant.

Action 509. The wireless device 10 may determine to transmit padding on the C-RNTI resource, i.e. using resource of the dynamic UL grant for transmitting padding.

Thus, when the wireless device 10 receives the dynamic UL grant (a grant issued to the C-RNTI, i.e. not to the SPS C-RNTI) valid in the TTI N, action 502, and the wireless device 10 has received and/or is configured with an SPS grant (to the SPS-C-RNTI) valid in the TTI N before, action 501:

the wireless device 10 may when a condition is fulfilled use the resources indicated on the dynamic UL grant in TTI N instead of the resources indicated in the SPS grant.

the wireless device 10 may e.g. use RV0 for the transmission. Typically retransmissions are done with different RVs. Embodiments herein may use a same redundancy version, such as RV0, since this use makes the radio network node reception behaviour simpler since the radio network node 12 knows what is coming and does not need to decode based on different versions.

If the HARQ buffer of the identified HARQ process corresponding to a transmission resource such as the TTI N is not empty, the wireless device 10 may consider the NDI as not toggled, i.e. triggers retransmission of the data in the HARQ buffer. This transmission can be considered a new transmission of previous HARQ data in the HARQ buffer, with the HARQ information received in the dynamic grant. Alternatively, the transmission can be considered an adaptive retransmission based on HARQ information in the dynamic UL grant.

In one embodiment (alternative), a non-adaptive retransmission of the data in the HARQ buffer is triggered instead, based on the received and/or configured SPS grant.

In one embodiment, the behaviour is conditional, depending on the HARQ feedback received on a Physical Hybrid-ARQ Indicator Channel (PHICH) in the downlink, which carries HARQ acknowledgements/non-acknowledgements (ACK/NACK) for uplink data transfers, action 504. For example, the wireless device 10 should only retransmit the data in the HARQ buffer, if the HARQ feedback is NACK received on PHICH, see action 505, otherwise the wireless device 10 applies legacy behaviour, i.e. send new data overriding the HARQ buffer, action 507.

If the HARQ buffer of the identified HARQ process corresponding to this III N, i.e. retransmission buffer intended to use the resources as indicated in the SPS UL grant, is empty, the wireless device 10 triggers the transmission of new UL data based on the dynamic UL grant, action 507.

In one embodiment, the behaviour is conditional, depending on whether new UL data, e.g. MAC service data units (SDU), or certain MAC Control Elements (CE), are available for transmission, or only padding Buffer Status Reports (BSR) and/or periodic BSR is available for transmission. For example, a new transmission based on the dynamic UL grant is only issued in case new UL data is available, action 507. Otherwise the dynamic UL grant may be skipped.

In another embodiment (alternative), even though the general configured behaviour of the wireless device 10 is to skip transmissions on dynamic UL grants if no new data is available, action 508, or certain MAC CEs, in case the dynamic UL grant is received when an SPS grant was received/is configured, the wireless device 10 does not skip the transmission based on the dynamic UL grant but instead transmits padding over the resources indicated by the dynamic UL grant, action 509. For the radio network node, this exceptional behaviour indicates that indeed no new UL data or old data in the HARQ buffer was available for transmission.

Figure 6:
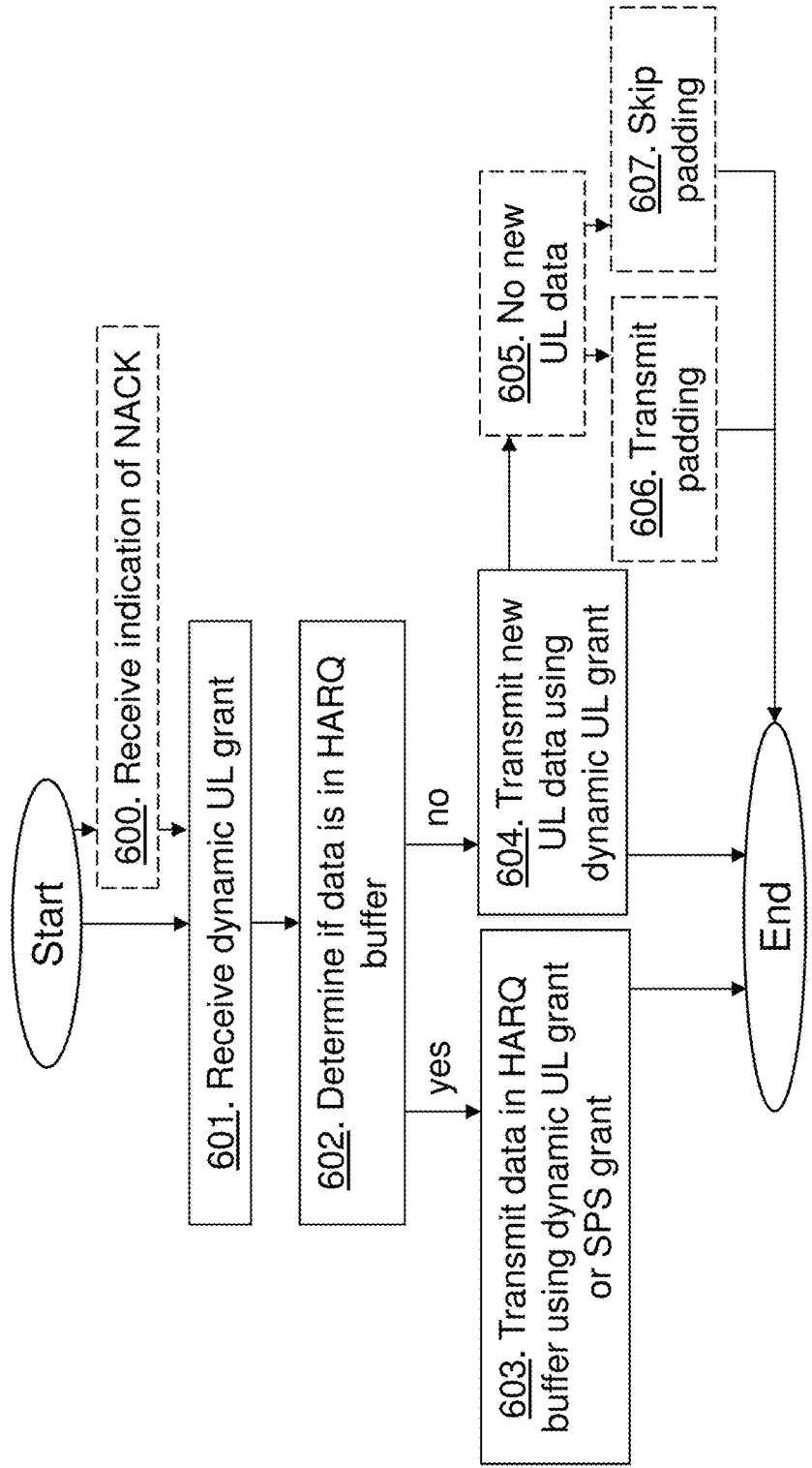
FIG. 6 is a schematic flowchart depicting a method performed by a wireless device according to embodiments herein.

FIG. 6 shows a flowchart depicting a method performed by the wireless device 10 for handling UL communication from the wireless device 10 (to the radio network node 12) in the wireless communication network 1. The wireless device 10 is configured with the one or more SPS grants and to skip padding transmissions of SPS grants. The actions do not have to be taken in the order stated below, but may be taken in any suitable order. Actions performed in some embodiments are marked with dashed boxes.

Action 600. The wireless device 10 may receive from the radio network node 12, an indication of a non-acknowledgement, NACK, e.g. receiving a NACK or not receiving an ACK, for the previous transmission. This action corresponds to action 504 in FIG. 5.

Action 601. The wireless device 10 receives the dynamic UL grant from the radio network node 12 indicating resources for an UL transmission to the radio network node 12. This action corresponds to action 502 in FIG. 5.

Action 602. The wireless device 10 determines that the HARQ buffer for transmission of the previous transmission, comprises data or not, which HARQ buffer is associated with a same HARQ process as the dynamic UL grant. The wireless device 10 thus determines that the HARQ buffer is empty or not, in other words, the wireless device 10 checks the HARQ buffer for data. The HARQ buffer is associated with the same HARQ process as the dynamic UL grant in that the one or more SPS grants is for a same transmission time interval as the dynamic UL grant. This action corresponds to action 405 in FIG. 4 and action 503 in FIG. 5.

Action 603. The wireless device 10 then transmits the data in the HARQ buffer using the one or more resources as indicated by the dynamic UL grant or as indicated by the SPS grant when determined that the HARQ buffer comprises data. This action corresponds to action 406 in FIG. 4 and action 505 in FIG. 5.

Action 604. The wireless device 10 transmits new UL data using the one or more resources as indicated by the dynamic UL grant when determined that the HARQ buffer comprises no data. When the wireless device 10 may, as stated in action 600, receive from the radio network node 12, the indication of the NACK for the previous transmission, the wireless device 10 may then transmit the data in the HARQ buffer using the one or more resources according to the dynamic UL grant or the SPS grant, otherwise the wireless device 10 may transmit the new UL data, if available. This action corresponds to action 507 in FIG. 5.

Action 606. The wireless device 10 may determine that no new UL data is available. This action corresponds to action 506 in FIG. 5.

Action 607. The wireless device may then, in case determined that no new UL data is available, transmit padding over the one or more resources indicated by the dynamic UL grant. This action corresponds to action 509 in FIG. 5.

Action 608. The wireless device may alternatively, in case determined that no new UL data is available, skip padding transmission over the one or more resources indicated by the dynamic UL grant. This action corresponds to action 508 in FIG. 5.

Thus by taking into account status of HARQ buffer when receiving the dynamic grant one may avoid that data is lost.

Figure 7:
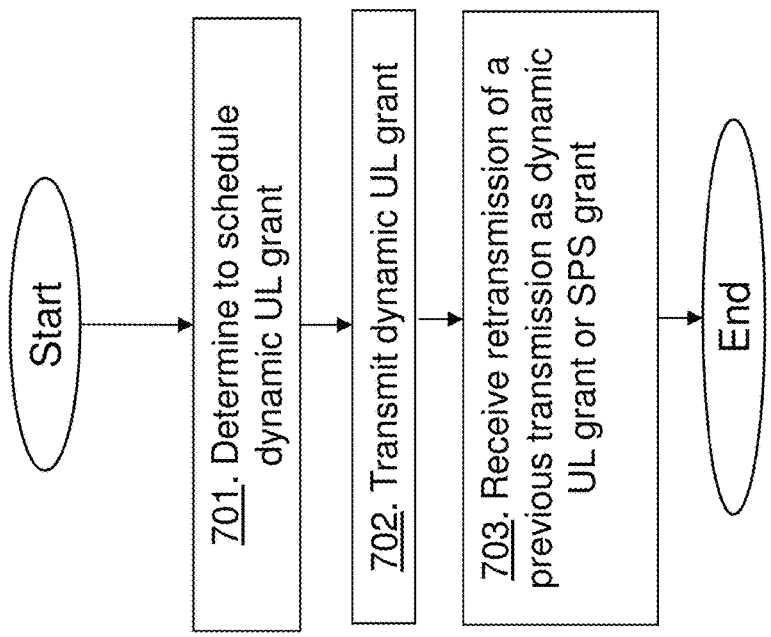
FIG. 7 is a schematic flowchart depicting a method performed by a radio network node according to embodiments herein.

FIG. 7 shows a flowchart depicting a method performed by radio network node 12 for handling UL communication from the wireless device 10 in the wireless communication network 1. The wireless device may be enabled or configured to skip padding of SPS grants, and with one or more SPS grants. The radio network node 12 may configure the wireless device 10 with the one or more SPS grants.

Action 701. The radio network node 12 determines to schedule a dynamic UL grant to the wireless device 10. The wireless device 10 is configured with one or more SPS grants and is configured to skip padding transmissions of SPS grants. The radio network node 12 may thus schedule the wireless device 10 for an UL transmission and create the dynamic UL grant. For example, the radio network node 12 may detect that there is more UL data available than the wireless device 10 can efficiently send on the SPS-granted resources. The radio network node 12 may decide to grant dynamically higher resources for transmission and thus schedules one or more dynamic UL grants for the wireless device 10. The dynamic UL grant may be associated with the same HARQ process as the previous transmission associated with one or more SPS grants. This action corresponds to action 403 in FIG. 4.

Action 702. The radio network node 12 transmits the dynamic UL grant to the wireless device 10 indicating the one or more resources for the UL transmission to the radio network node 12. This action corresponds to action 404 in FIG. 5.

Action 703. The radio network node 12 then receives the retransmission of the previous transmission associated with the one or more SPS grants, from the wireless device 10, over one or more resources as scheduled in the dynamic UL grant, or alternatively over one or more resources of the one or more SPS grants. It should here be noted that the radio network node did not notice the first transmission on the SPS resources, and the retransmission received is therefore effectively "a first transmission" from the radio network node's perspective. Hence, retransmission is reflecting the transmission from the wireless device's perspective.

Figure 8:
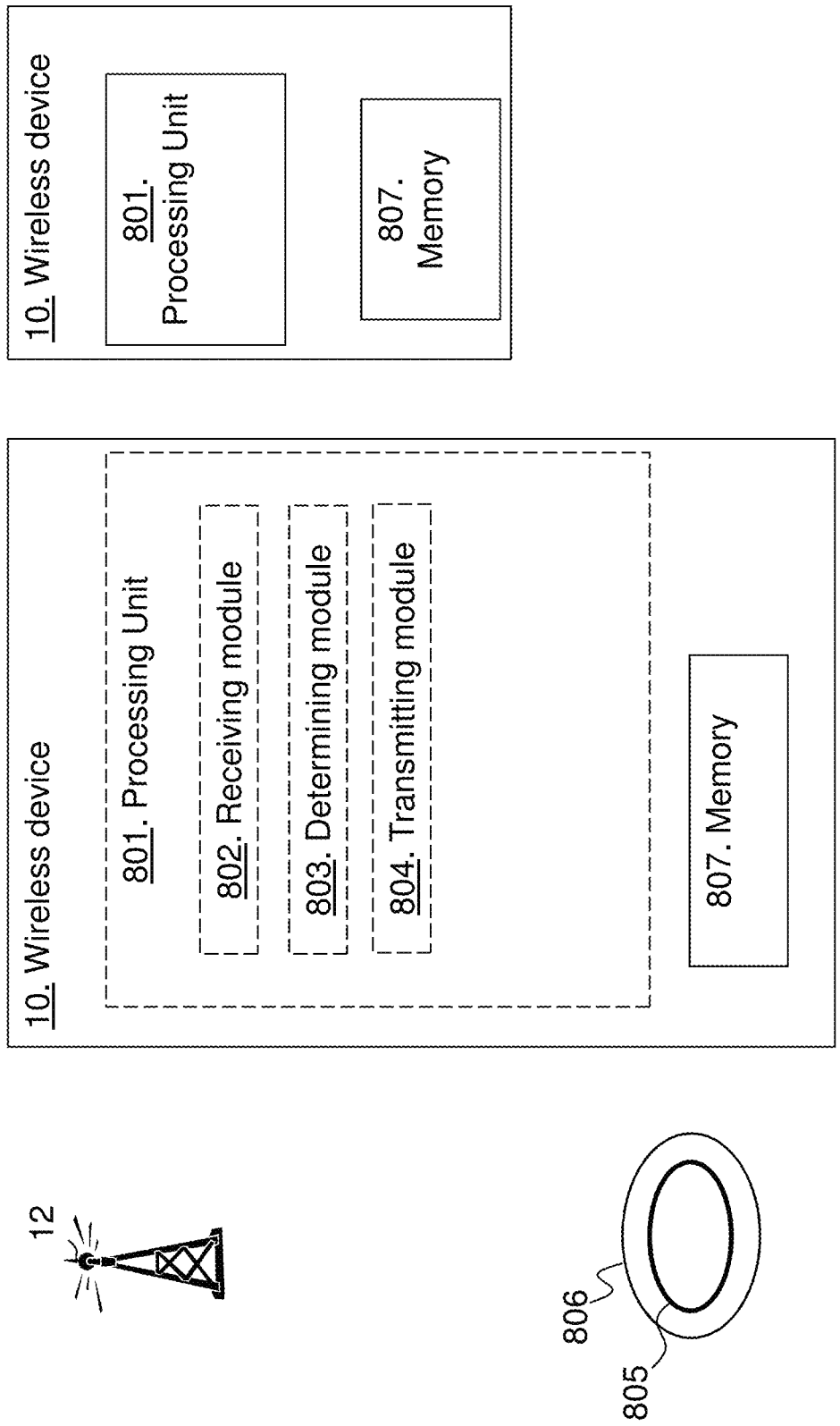
FIG. 8 is a block diagram depicting a wireless device according to embodiments herein.

FIG. 8 is a block diagram depicting, in two embodiments, the wireless device 10 according to embodiments herein for handling UL communication from the wireless device 10 in the wireless communication network 1. The wireless device 10 is configured to skip padding transmissions of SPS grants, and configured with one or more SPS grants.

The wireless device 10 may comprise a processing unit 801, e.g. one or more processors, configured to perform the methods herein.

The wireless device 10 may comprise a receiving module 802, e.g. a receiver or a transceiver. The wireless device 10, the processing unit 801, and/or the receiving module 802 is configured to receive the dynamic UL grant from the radio network node 12 indicating one or more resources for an UL transmission to the radio network node 12. The C-RNTI of the dynamic UL grant is different than the SPS-C-RNTI of the SPS grant.

The wireless device 10 may comprise a determining module 803. The wireless device 10, the processing unit 801, and/or the determining module 803 is configured to determine that the HARQ buffer for transmission of the previous transmission comprises data or not. The HARQ buffer is associated with the same HARQ process as the dynamic UL grant. I.e. the wireless device 10, the processing unit 801, and/or the determining module 803 may be configured to check status of the HARQ buffer. The HARQ buffer is associated with the same HARQ process as the dynamic UL grant in that the one or more SPS grants is for a same transmission time interval as the dynamic UL grant.

The wireless device 10 may comprise a transmitting module 804, e.g. a transmitter or a transceiver. The wireless device 10, the processing unit 801, and/or the transmitting module 804 is configured to transmit the data in the HARQ buffer using one or more resources as indicated by the dynamic UL grant or as indicated by the SPS grant when determined that the HARQ buffer comprises data. Advantage of using SPS grant is that exactly previous transmission can be repeated. Advantage of using dynamic grant is that radio network node 12 actually expects transmission on resources of dynamic UL grant, which simplifies its implementation.

The wireless device 10, the processing unit 801, and/or the transmitting module 804 is further configured to transmit new UL data using the one or more resources as indicated by the dynamic UL grant when determined that the HARQ buffer comprises no data.

The wireless device 10, the processing unit 801, and/or the receiving module 802 may be configured to receive from the radio network node 12, the indication of a non-acknowledgement, NACK, for the previous transmission and then, the wireless device 10, the processing unit 801, and/or the transmitting module 804 may be configured to transmit the data in the HARQ buffer using the one or more resources according to the dynamic UL grant or the SPS grant, otherwise the wireless device 10, the processing unit 801, and/or the transmitting module 804 may be configured to transmit configured to transmit the new UL data. Thus, the wireless device 10, the processing unit 801, and/or the transmitting module 804 may be configured to transmit the data in the HARQ buffer using the one or more resources according to the dynamic UL grant or the SPS grant when previously received a NACK from the radio network node 12 for the previous transmission, otherwise the wireless device 10, the processing unit 801, and/or the transmitting module 804 may be configured to transmit may new UL data, if available.

The wireless device 10, the processing unit 801, and/or the determining module 803 may be configured to determine that no new UL data is available, and in that case, the wireless device 10, the processing unit 801, and/or the transmitting module 804 may be configured to transmit padding over the one or more resources indicated by the dynamic UL grant.

The wireless device 10, the processing unit 801, and/or the determining module 803 may be configured to determine that no new UL data is available, and in that case, the wireless device 10, the processing unit 801, and/or the transmitting module 804 may be configured to skip padding transmission over the one or more resources indicated by the dynamic UL grant.

The methods according to the embodiments described herein for the wireless device 10 are respectively implemented by means of e.g. a computer program 805 or a computer program product, comprising instructions, i.e., software code portions, which, when executed on at least one processor, cause the at least one processor to carry out the actions described herein, as performed by the wireless device 10. The computer program 805 may be stored on a computer-readable storage medium 806, e.g. a disc or similar. The computer-readable storage medium 806, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 may further comprise a memory 807. The memory comprises one or more units to be used to store data on, such as scheduled resources, C-RNTIs, SPS RNTIs, dynamic UL grants, SPS UL grants, applications to perform the methods disclosed herein when being executed, and similar. Thus, the wireless device 10 may comprise the processing circuitry and the memory, said memory comprising instructions executable by said processing circuitry whereby said wireless device is operative to perform the methods herein.

Figure 9:
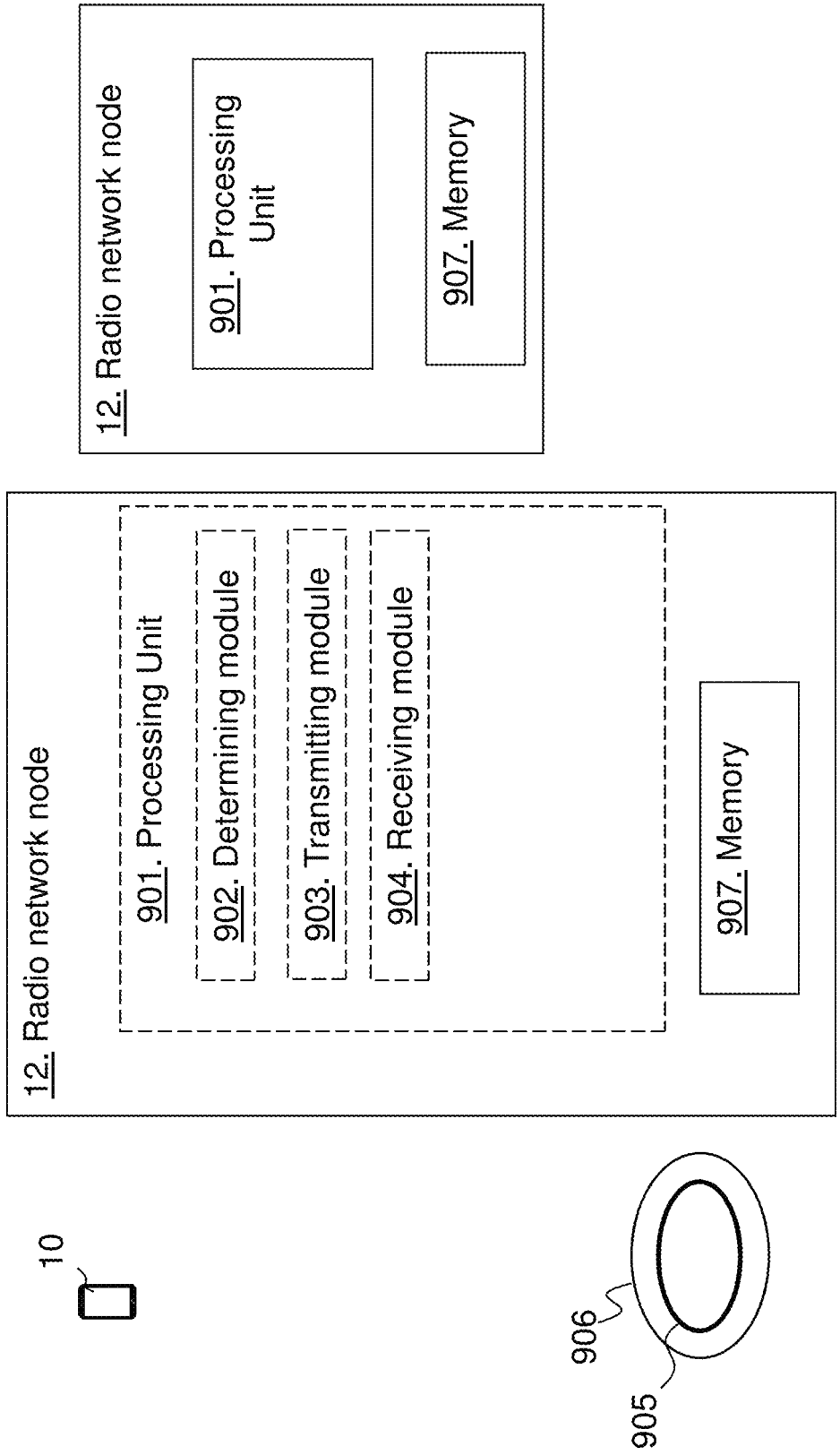
FIG. 9 is a block diagram depicting a radio network node according to embodiments herein.

FIG. 9 is a block diagram depicting the radio network node 12, in two embodiments, for handling UL communication from the wireless device 10 in the wireless communication network 1. The radio network node 12 may be configured to configure the wireless device to skip padding of an SPS grant, and with one or more SPS grants. Thus, the radio network node 12 may configure the wireless device 10 with the one or more SPS grants.

The radio network node 12 may comprise a processing unit 901, e.g. one or more processors, configured to perform the methods herein.

The radio network node 12 may comprise a determining module 902. The radio network node 12, the processing unit 901, and/or the determining module 902 is configured to determine to schedule the dynamic UL grant to the wireless device 10, which wireless device is configured with one or more SPS grants and is configured to skip padding transmissions of SPS grants. The radio network node 12, the processing unit 901, and/or the determining module 902 may be configured to schedule the wireless device 10 for an UL transmission and create the dynamic UL grant. For example, the radio network node 12, the processing unit 901, and/or the determining module 902 may be configured to detect that there is more UL data available than the wireless device 10 can efficiently send on the SPS-granted resources. Therefore the radio network node 12, the processing unit 901, and/or the determining module 902 may be configured to decide to grant dynamically higher resources for transmission and thus to schedule one or more dynamic grants for the wireless device 10.

The radio network node 12 may comprise a transmitting module 903, e.g. a transmitter or a transceiver. The radio network node 12, the processing unit 901, and/or the transmitting module 903 is configured to transmit the dynamic UL grant to the wireless device indicating one or more resources for an UL transmission to the radio network node 12. The dynamic UL grant may be associated with the same HARQ process as the previous transmission associated with one or more SPS grants.

The radio network node 12 may comprise a receiving module 904, e.g. a receiver or a transceiver. The radio network node 12, the processing unit 901, and/or the receiving module 904 is configured to receive the (re)transmission of a previous transmission associated with the one or more SPS grants, from the wireless device 10, over one or more resources as scheduled in the dynamic UL grant, or alternatively over one or more resources of the one or more SPS grants.

The methods according to the embodiments described herein for the radio network node 12 are respectively implemented by means of e.g. a computer program 905 or a computer program product, comprising instructions, i.e., software code portions, which, when executed on at least one processor, cause the at least one processor to carry out the actions described herein, as performed by the radio network node 12. The computer program 905 may be stored on a computer-readable storage medium 906, e.g. a disc or similar. The computer-readable storage medium 906, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

The radio network node 12 may further comprise a memory 907. The memory comprises one or more units to be used to store data on, such as scheduled resources, C-RNTIs, SPS RNTIs, dynamic UL grants, SPS UL grants, applications to perform the methods disclosed herein when being executed, and similar. Thus, the radio network node 12 may comprise the processing circuitry and the memory, said memory comprising instructions executable by said processing circuitry whereby said radio network node 12 is operative to perform the methods herein.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling uplink (UL) communication from the wireless device in a wireless communication network, which wireless device is configured with one or more Semi Persistent Scheduling (SPS) grants and is further configured to skip padding transmissions of SPS grants, the method comprising:

receiving a dynamic UL grant from a radio network node indicating one or more resources for a UL transmission to the radio network node;

determining whether a Hybrid Automatic Repeat Request (HARQ) buffer for transmission of a previous transmission comprises data or not, which HARQ buffer is associated with a same HARQ process as the dynamic UL grant; and transmitting the data in the HARQ buffer using one or more resources as indicated by the dynamic UL grant or as indicated by the SPS grant when determined that the HARQ buffer comprises data, and transmitting new UL data using the one or more resources as indicated by the dynamic UL grant when determined that the HARQ buffer comprises no data.

2. The method of claim 1, further comprising receiving from the radio network node, an indication of a non-acknowledgement (NACK) for the previous transmission and then transmitting the data in the HARQ buffer using the one or more resources according to the dynamic UL grant or the SPS grant, otherwise transmitting new UL data.

3. The method of claim 1, further comprising determining that no new UL data is available, and in that case
transmitting padding over the one or more resources indicated by the dynamic UL grant.

4. The method of claim 1, further comprising determining that no new UL data is available, and in that case
skipping padding transmission over the one or more resources indicated by the dynamic UL grant.

5. The method of claim 1, wherein the HARQ buffer is associated with the same HARQ process as the dynamic UL grant in that the one or more SPS grants is for a same transmission time interval as the dynamic UL grant.

6. A method performed by a radio network node for handling uplink (UL) communication from a wireless device in a wireless communication network, the method comprising:
determining to schedule a dynamic UL grant to the wireless device, which wireless device is configured with one or more Semi Persistent Scheduling (SPS) grants and is configured to skip padding transmissions of SPS grants;
transmitting the dynamic UL grant to the wireless device indicating one or more resources for an UL transmission to the radio network node; and
receiving a retransmission of a previous transmission associated with the one or more SPS grants, from the wireless device, over one or more resources as scheduled in the dynamic UL grant.

7. The method of claim 6, wherein determining to schedule the dynamic UL grant comprises detecting that there is more UL data available than the wireless device can efficiently send on the SPS-granted resources.

8. The method of claim 6, wherein determining to schedule the dynamic UL grant comprises deciding to grant dynamically higher resources for transmission.

9. The method of claim 6, wherein the dynamic UL grant is associated with a same Hybrid Automatic Repeat Request (HARQ) process as the previous transmission associated with one or more SPS grants.

10. A wireless device for handling uplink (UL) communication from the wireless device in a wireless communication network, which wireless device is configured with one or more Semi Persistent Scheduling (SPS) grants and to skip padding transmissions of SPS grants, the wireless device comprising:
a transceiver circuit;
a processor operatively coupled to the transceiver circuit; and
a memory operatively coupled to the processor and storing instructions for execution by the processor, the instructions being configured to cause the processor to control the transceiver circuit and to:
receive a dynamic UL grant from a radio network node indicating one or more resources for an UL transmission to the radio network node;
determine that a Hybrid Automatic Repeat Request (HARQ) buffer for transmission of a previous transmission comprises data or not, which HARQ buffer is associated with a same HARQ process as the dynamic UL grant;
transmit the data in the HARQ buffer using one or more resources as indicated by the dynamic UL grant or as indicated by the SPS grant when determined that the HARQ buffer comprises data, and to
transmit new UL data using the one or more resources as indicated by the dynamic UL grant when determined that the HARQ buffer comprises no data.

11. The wireless device of claim 10, the instructions being further configured to cause the processor to receive from the radio network node, an indication of a non-acknowledgement (NACK), for the previous transmission and then transmit the data in the HARQ buffer using the one or more resources according to the dynamic UL grant or the SPS grant, otherwise transmitting new UL data.

12. The wireless device of claim 10, the instructions being further configured to cause the processor to determine that no new UL data is available, and in that case transmit padding over the one or more resources indicated by the dynamic UL grant.

13. The wireless device of claim 10, the instructions being further configured to cause the processor to determine that no new UL data is available, and in that case skip padding transmission over the one or more resources indicated by the dynamic UL grant.

14. The wireless device of claim 10, wherein the HARQ buffer is associated with the same HARQ process as the dynamic UL grant in that the one or more SPS grants is for a same transmission time interval as the dynamic UL grant.

15. A radio network node for handling uplink (UL) communication from a wireless device in a wireless communication network, the radio network node comprising:
a transceiver circuit;
a processor operatively coupled to the transceiver circuit; and
a memory operatively coupled to the processor and storing instructions for execution by the processor, the instructions being configured to cause the processor to control the transceiver circuit and to:
determine to schedule a dynamic UL grant to the wireless device which wireless device is configured with one or more Semi Persistent Scheduling (SPS) grants and is configured to skip padding transmissions of SPS grants;
transmit the dynamic UL grant to the wireless device indicating one or more resources for an UL transmission to the radio network node; and to
receive a retransmission of a previous transmission associated with the one or more SPS grants, from the wireless device, over one or more resources as scheduled in the dynamic UL grant.

16. The radio network node of claim 15, the instructions being further configured to cause the processor to determine to schedule the dynamic UL grant by detecting that there is more UL data available than the wireless device can efficiently send on the SPS-granted resources.

17. The radio network node of claim 15, the instructions being further configured to cause the processor to determine to schedule the dynamic UL grant by deciding to grant dynamically higher resources for transmission.

18. The radio network node of claim 15, wherein the dynamic UL grant is associated with a same Hybrid Automatic Repeat Request (HARQ) process as the previous transmission associated with one or more SPS grants.

* * * * *